United States Patent [19]

Terasawa

[11] Patent Number: 4,543,591

[45] Date of Patent: Sep. 24, 1985

[54] SUCTION RECOVERY APPARATUS

[75] Inventor: Koji Terasawa, Mitaka, Japan

[73] Assignee: Canon Kabushiki Kaisha, Tokyo, Japan

[21] Appl. No.: 490,416

[22] Filed: May 2, 1983

[30] Foreign Application Priority Data

May 11, 1982 [JP] Japan ................................ 57-79402

[51] Int. Cl.[4] ........................................ G01D 15/18

[52] U.S. Cl. ........................................ 346/140 R

[58] Field of Search ................................ 346/140

[56] References Cited

U.S. PATENT DOCUMENTS

| | | | |
|---|---|---|---|
| 3,673,601 | 6/1972 | Hertz | 346/75 |
| 4,045,802 | 8/1977 | Fukazawa et al. | 346/140 |
| 4,123,761 | 10/1978 | Kimura et al. | 346/140 |
| 4,160,982 | 7/1979 | Keur | 346/75 |
| 4,272,772 | 6/1981 | Geil | 346/140 |
| 4,306,245 | 12/1981 | Kasugayama et al. | 346/140 |
| 4,369,454 | 1/1983 | Kyogoku et al. | 346/140 |
| 4,383,263 | 5/1983 | Ozawa et al. | 346/140 |
| 4,394,669 | 7/1983 | Ozawa | 346/140 R |
| 4,403,233 | 9/1983 | Terasawa | 346/140 R |
| 4,410,900 | 10/1983 | Terasawa | 346/140 R |
| 4,492,969 | 1/1985 | Terasawa | 346/140 |

*Primary Examiner*—Joseph W. Hartary

*Attorney, Agent, or Firm*—Fitzpatrick, Cella, Harper & Scinto

[57] ABSTRACT

A suction recovery apparatus comprises a capping unit for hermetically sealing the end of a recording head for discharging ink, a unit for mounting the capping unit movement toward the recording head, a negative pressure generating unit for generating a negative pressure, and a lever rotatable about an axis for moving the capping unit toward the recording head by rotation in one direction to hermetically seal the end of the head and causing the negative pressure generating unit to generate a negative pressure which sucks the end of the recording head.

8 Claims, 3 Drawing Figures

SUCTION RECOVERY APPARATUS

BACKGROUND OF THE INVENTION

1. Field of the Invention

This invention relates to a suction recovery apparatus for an ink jet recording apparatus, and in particular to a suction recovery apparatus for easily and reliably recovering from unsatisfactory ink discharge, for example, unsatisfactory discharge during interchange of the main tank.

2. Description of the Prior Art

An ink jet recording apparatus has the possibility of giving rise to ink leakage from the nozzle during the transportation or long-time non-use thereof and therefore, the nozzle must be capped. Also, in an ink jet recording apparatus, ink may sometimes fail to be discharged due to impact forces or paper powder and at such time, it is necessary to provide suction through the end of the nozzle.

SUMMARY OF THE INVENTION

It is an object of the present invention to provide a suction recovery apparatus for an ink jet printer which is easy to operate for suction recovery.

It is another object of the present invention to enable the suction recovery operation to be accomplished by one touch.

It is still another object of the present invention to enable the suction recovery operation to be accomplished by a light operating force.

Other objects of the present invention will become apparent from the following detailed description taken in conjunction with the accompanying drawings.

DESCRIPTION OF THE PREFERRED EMBODIMENTS

Figure 1:
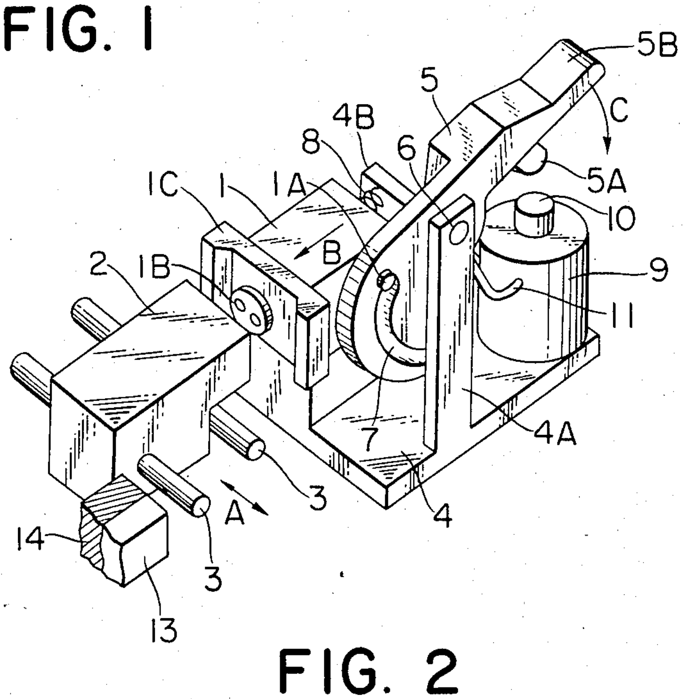
FIG. 1 is a perspective view of an embodiment of the present invention.
Figure 2:
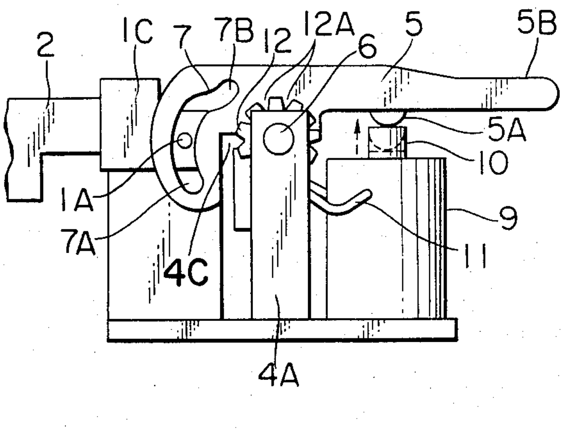
FIG. 2 is a side view of the embodiment.

Referring to FIGS. 1 and 2 which show an embodiment of the present invention, the forward end of a cap holder 1 has integrally attached thereto an elastic cap 1B for hermetically sealing a nozzle (not shown) located at one end of an ink jet recording head 2. The recording head 2 is movable along guides 3 in the direction of arrow A. A head guide 1c is also integrally attached to the forward end of the cap holder 1 and, when the holder 1 moves in the direction of arrow B, the sloping surfaces on the opposite sides of the head guide the head 2 so that the nozzle is accurately hermetically sealed by the elastic cap 1B. The cap holder 1 is held on a bed 4 so as to be slidable only in directions perpendicular to the guides 3, i.e., the direction B and counter-B direction. A pin 1A is projectedly provided on a side of the cap holder 1 and is engaged by a cam slot 7 in a lever 5. This engagement relation may be reversed, that is, a slot may be formed in the holder and a pin may be provided on the lever. The lever 5 is rotatably supported on the support shaft 6 of the strut 4A of the bed 4. The cap holder 1 is movable in the direction B or the counter-B direction by pivotal movement of the lever 5 on the basis of the engagement between the pin 1A and the cam slot 7. Designated by 8 is a coil spring held between the rear wall 4B of the bed 4 and the rearward end of the cap holder 1 so that the pin 1A is normally in contact with the inner surface of the cam slot to prevent backlash of the bed and the cap holder. Denoted by 9 is a piston type negative pressure suction device which is manually operated negative pressure generating means and which is fixed to the bed 4. The suction device 9 generates a negative pressure by the piston lever 10 thereof being depressed by a lever pressing portion 5A projectedly provided on the underside of the lever 5. An ink sucking tube 11 is connected between the suction device 9 and the elastic cap 1B and sucks ink and air from the nozzle of the recording head 2 with the aid of the negative pressure generated by the suction device 9, thereby releasing the unsatisfactory discharge of the nozzle. Designated by 5B is the operating portion of the lever.

Referring to FIG. 2, a grooved pulley 12 radially formed with grooves 12A is integrally attached to the lever 5 so that pivoal movement of the lever 5 may be effected in a click-like fashion. A resilient pawl 4C fixed to the bed 4 is resiliently fitted in a groove 12A of the grooved pulley 12 to pivot the lever 5 in a click-like fashion and stop the lever 5 in its pivoted position.

Operation of the suction recovery apparatus of the above-described construction will now be described. When the lever 5 is first pivoted in the direction of arrow C about the shaft 6, the pin 1A integral with the holder 1 is guided by the slot cam 7 of the lever and advances in the direction of arrow B, i.e., toward the head 2. In this manner, the elastic cap 1B is firmly urged against the nozzle of the head 2 by the spring 8 and the nozzle portion is hermetically sealed by the elastic cap 1B. In this state, when the lever operating portion 5B is further depressed in the direction of arrow C, the piston 10 is depressed and the interior of the suction device 9 assumes a negative pressure, so that ink, bubbles, etc. are discharged from the nozzle through the tube 11 connected to the elastic cap 1B and dust or the like near the nozzle is sucked and removed, whereby discharge is recovered. During this suction recovery operation, the pin 1A engages a slot cam portion 7A of the same radius and therefore, the holder 1 does not move back and forth and the nozzle is maintained hermetically sealed. The piston 10 is depressed to a position indicated by a dotted line and then liberated, whereupon it is returned to the position indicated by solid line by a return spring (not shown) within the apparatus. By the return force of this spring, the lever 5 is also returned to its position of FIG. 2. After the interior of the tube assumes the atmospheric pressure in a short time, the lever operating portion 5B is rotated in the counter-C direction, whereupon the lever pressing portion 5A becomes disengaged from the piston and the hermetic sealing of the nozzle is released, whereafter the pin 1A of the holder comes into engagement with the slot cam lock portion 7B. This state is shown in FIG. 1, wherein the shaft 6, the pin 1A of the holder and the slot cam lock portion 7B are on a horizontal line, whereby the advancing force of the holder 1 toward the head by the spring 8 is blocked. With the cap opened, the recording head 2 moves and effects printing. This series of lever operations are effected in the position of FIG. 1 wherein a side surface of the recording head is controlled by a damper 14 provided on a side plate 13, after unsatisfactory discharge of the ink jet recording apparatus has been confirmed. Since the lever operating portion 5B is more distant from the shaft 6 than the pressing portion 5A, the force required for operation may be lower and the suction recovery operation can be accomplished by a light force.

Figure 3:
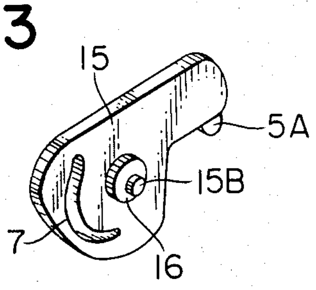
FIG. 3 illustrates a lever for constituting another embodiment of the present invention.

FIG. 3 shows a lever 15 for constituting another embodiment of the present invention. In FIG. 3, a gear 16 meshing with the pinion gear of a motor which is a rotative drive source is integrally secured to a pivot shaft 15B held by the strut 4A. The gear 16 of the lever 15 meshes with a negative pressure generating gear and generates a negative pressure upon rotation of the lever 15, and such negative pressure sucks the end of the nozzle. If the angle of rotation of the slot cam 7 is selected to a great value, the reduction ratio of the gear can also be selected to a great value and the motor load can be decreased.

According to the present invention, as has been described above, the negative pressure for the hermetic sealing of the nozzle and the suction of ink can be generated simply by operating a single lever once and thus, a suction recovery apparatus which requires a low operating force and which is easy to operate can be provided. Also, if a gear is provided on a portion of a single lever, automation of the ink jet negative pressure suction device by motor control will become possible.

What I claim is:

1. A suction recovery apparatus comprising:

capping means for capping the end of a recording head for discharging ink;

holding means for mounting said capping means for movement toward said recording head;

negative pressure generating means for generating a negative pressure; and a lever rotatable about an axis for moving said capping means toward said recording head by rotation about said axis in one direction to cap the end of said recording head and causing said negative pressure generating means to generate a negative pressure on the end of said recording head.

2. A suction recovery apparatus according to claim 1 wherein said lever includes an operating portion for manually rotating said lever, said negative pressure generating means is a manually operated pump and the distance from said axis of said lever to said second contact portion is smaller than the distance from said axis to said operating portion.

3. A suction recovery apparatus according to claim 1, further comprising click means for resiliently stopping the rotation of said lever.

4. A suction recovery apparatus according to claim 1, wherein said lever causes said negative pressure generating means to generate a negative pressure after said recording head is hermetically capped by said capping means.

5. A suction recovery apparatus according to claim 1, further comprising biasing means for urging said capping means against said recording head.

6. A suction recovery apparatus according to claim 1, wherein said lever has a gear rotatable by a separate power source.

7. A suction recovery apparatus according to claim 1, wherein said holding means holds said negative pressure generating means and said lever.

8. A suction recovery apparatus according to claim 1, wherein said lever includes a first contact portion and a second contact portion and rotation of said lever about said axis brings said first contact portion into contact with said capping means and a second contact portion into contact with said negative pressure generating means.

* * * * *